(12) United States Patent
Goyal

(10) Patent No.: US 8,744,446 B2
(45) Date of Patent: Jun. 3, 2014

(54) SENDING MEASUREMENT MESSAGES WITH UPDATED CHANNEL QUALITY MEASUREMENT INFORMATION

(75) Inventor: Anish K. Goyal, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/602,056

(22) Filed: Aug. 31, 2012

(65) Prior Publication Data
US 2014/0066065 A1    Mar. 6, 2014

(51) Int. Cl.
*H04W 36/00* (2009.01)

(52) U.S. Cl.
USPC ......................................................... 455/436

(58) Field of Classification Search
CPC ... H04W 72/085; H04W 24/10; H04L 5/0007
USPC .......... 455/332, 423, 436–437, 522; 370/252, 370/331
See application file for complete search history.

(56) References Cited

U.S. PATENT DOCUMENTS

| | | | |
|---|---|---|---|
| 6,345,185 B1* | 2/2002 | Yoon et al. | 455/436 |
| 2004/0248605 A1* | 12/2004 | Cao et al. | 455/522 |
| 2008/0130584 A1* | 6/2008 | Pani et al. | 370/332 |
| 2009/0113268 A1* | 4/2009 | Vihriala | 714/749 |
| 2009/0141690 A1* | 6/2009 | Fan et al. | 370/335 |
| 2009/0163199 A1 | 6/2009 | Kazmi et al. | |
| 2009/0238138 A1* | 9/2009 | Huang et al. | 370/331 |
| 2009/0303951 A1* | 12/2009 | Lunttila et al. | 370/329 |
| 2010/0234014 A1* | 9/2010 | Virkki et al. | 455/423 |
| 2010/0279679 A1* | 11/2010 | Young et al. | 455/423 |
| 2012/0099463 A1* | 4/2012 | Saito et al. | 370/252 |
| 2012/0178438 A1 | 7/2012 | Vashi et al. | |
| 2012/0178439 A1 | 7/2012 | Vashi et al. | |
| 2012/0201166 A1* | 8/2012 | DiGirolamo et al. | 370/252 |

FOREIGN PATENT DOCUMENTS

| | | |
|---|---|---|
| EP | 1203499 | 10/2004 |
| EP | 1973367 | 9/2008 |

OTHER PUBLICATIONS

PCT/US2012/056408—International Search Report and Written Opinion mailed Mar. 29, 2013.

* cited by examiner

*Primary Examiner* — Nathan Taylor
(74) *Attorney, Agent, or Firm* — Womble Carlyle Sandridge & Rice LLP

(57) ABSTRACT

A method of sending measurement messages with updated channel quality measurement information is provided. The method can include sending a first measurement message generated based at least in part on a first channel quality measurement in unassured mode. The method can further include determining whether a handover message is received within a timeout period following sending the first measurement message. In an instance in which it is determined that a handover message is not received within the timeout period, the method can additionally include determining an updated channel quality measurement and sending a new measurement message generated based at least in part on the updated channel quality measurement in unassured mode.

12 Claims, 7 Drawing Sheets

SENDING MEASUREMENT MESSAGES WITH UPDATED CHANNEL QUALITY MEASUREMENT INFORMATION

FIELD OF THE DESCRIBED EMBODIMENTS

The described embodiments relate generally to wireless communications and more particularly to sending measurement messages with updated channel quality measurement information.

BACKGROUND

Mobile wireless communication devices, such as a cellular telephone or tablet computing device, can operate in a wireless communication network of overlapping "cells." Each cell can provide a geographic area of wireless signal coverage that extends from a base station located in the cell. The mobile wireless communication device can receive signals transmitted from one or more cells in the wireless communication network. The base stations in each of the cells can be located at different distances from the mobile wireless communication device, and therefore signals received at the mobile wireless communication device can vary in signal strength and/or signal quality. The mobile wireless communication device can measure and monitor the received signals to determine to which cells a connection can be achieved and maintained.

The mobile wireless communication network can transmit measurement messages to the wireless communication network informing the wireless communication network of changes to channel quality conditions of signals transmitted by cells and observed by the mobile wireless communication device. In some current implementations, these measurement messages are sent in an assured mode requiring acknowledgement from the wireless communication network before the mobile wireless communication device considers their transmission complete. An unacknowledged measurement message is retransmitted until an acknowledgement is received, or in some networks until the measurement message has been retransmitted a threshold number of times. However, due to factors such as mobility of the mobile wireless communication, channel quality can change rapidly. As such, by the time an unacknowledged measurement message is retransmitted, the channel quality measurement on which the measurement message can be obsolete. Accordingly, retransmission of a measurement message can result in a handover decision being made on the basis of obsolete channel quality measurements. Further, in some instances, repeated retransmissions of a measurement message can result in termination of a connection between the mobile wireless communication device and the wireless communication network.

SUMMARY OF THE DESCRIBED EMBODIMENTS

Some embodiments disclosed herein provide for transmission of updated channel quality measurement information so that cell selection decisions are not based on outdated channel quality information that can result from retransmission of an unacknowledged measurement message. In this regard, a mobile wireless communication device in accordance with some example embodiments sends a measurement message in an unassured mode in which receipt of an acknowledgement from the wireless communication network is not required. If a handover message is not received within a predefined timeout period following sending the handover message, then a new measurement message generated based on an updated channel quality measurement can be sent to the wireless communication network. Accordingly, retransmission of measurement messages carrying outdated channel quality measurement information can be avoided. As such, the possibility of handover decisions being made on the basis of outdated channel quality information that might otherwise occur if a measurement message is retransmitted can be reduced. In this regard, one situation that results in retransmission of measurement messages in prior art systems is degrading signal quality resulting from device mobility. As device mobility can greatly affect channel quality, channel quality may change rapidly in a scenario in which a device is moving. Accordingly, sending measurement messages generated based on an updated channel quality measurement in accordance with some example embodiments rather than retransmitting a previously sent measurement message that is not acknowledged can reduce the possibility of dropped calls and handover decisions being made on the basis of outdated channel quality information.

In a first embodiment, a method is provided. The method of the first embodiment can include sending a first measurement message generated based at least in part on a first channel quality measurement in unassured mode; and determining whether a handover message is received within a timeout period following sending the first measurement message. In an instance in which it is determined that a handover message is not received within the timeout period, the method can additionally include determining an updated channel quality measurement and sending a new measurement message generated based at least in part on the updated channel quality measurement in unassured mode.

In a second embodiment, a mobile wireless communication device is provided. The mobile wireless communication device of the second embodiment can include a transceiver configured to transmit data to and receive data from a wireless network; and processing circuitry coupled to the first wireless transceiver. The processing circuitry can be configured to control the mobile wireless communication device to send a first measurement message generated based at least in part on a first channel quality measurement in unassured mode; and determine whether a handover message is received within a timeout period following sending the first measurement message. In an instance in which it is determined that a handover message is not received within the timeout period, the processing circuitry can be configured to control the mobile wireless communication device to additionally determine an updated channel quality measurement and send a new measurement message generated based at least in part on the updated channel quality measurement in unassured mode.

In a third embodiment, a computer program product is provided. The computer program product of the third embodiment can include at least one non-transitory computer readable storage medium having program code stored thereon. The program code can include program code for sending a first measurement message generated based at least in part on a first channel quality measurement in unassured mode; program code for determining whether a handover message is received within a timeout period following sending the first measurement message; and program code for, in an instance in which it is determined that a handover message is not received within the timeout period, determining an updated channel quality measurement and sending a new measurement message generated based at least in part on the updated channel quality measurement in unassured mode.

In a fourth embodiment, an apparatus is provided that can include means for sending a first measurement message generated based at least in part on a first channel quality measurement in unassured mode; means for determining whether a handover message is received within a timeout period following sending the first measurement message; and means for, in an instance in which it is determined that a handover message is not received within the timeout period, determining an updated channel quality measurement and sending a new measurement message generated based at least in part on the updated channel quality measurement in unassured mode.

In a fifth embodiment, an apparatus including processing circuitry is provided. The processing circuitry can be configured to determine, based at least in part on a first channel quality measurement, that a first measurement message should be sent; generate the first measurement message based at least in part on the first channel quality measurement for sending in unassured mode; and determine whether a handover message is received within a timeout period following the first measurement message being sent. In an instance in which it is determined that a handover message is not received within the timeout period, the processing circuitry can be further configured to determine an updated channel quality measurement; and generate a new measurement message based at least in part on the updated channel quality measurement for sending in unassured mode.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein address the problem of retransmission of measurement messages that include stale channel quality information, which can lead to handover decisions being made on the basis of obsolete channel quality information and, potentially, to termination of a connection. In this regard, some example embodiments provide a mobile wireless communication device configured to send a measurement message in an unassured mode in which receipt of an acknowledgement from the wireless communication network is not required. If a handover message is not received within a predefined timeout period following sending the handover message in such embodiments, then a new measurement message generated based on an updated channel quality measurement can be sent to the wireless communication network. Accordingly, retransmission of measurement messages carrying outdated channel quality measurement information can be avoided.

Figure 1:
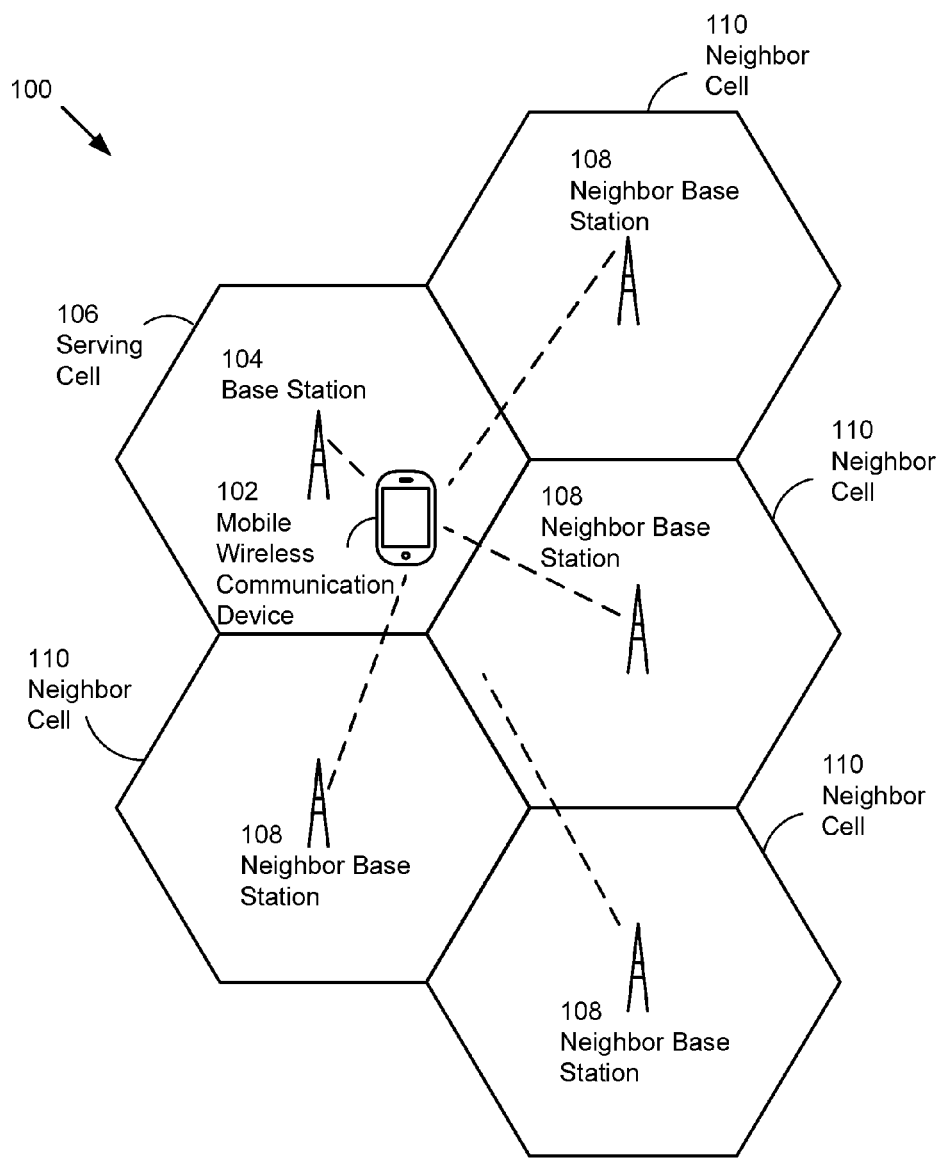
FIG. 1 illustrates a wireless communication network of overlapping wireless communication cells to which a mobile wireless communication device can connect in accordance with some example embodiments.

FIG. 1 illustrates a wireless communication network 100 of overlapping wireless communication cells to which a mobile wireless communication device 102 can connect. Mobile wireless communication device 102 can, for example, comprise a cellular phone, tablet computing device, or other computing device capable of operating within wireless communication network 100. Each wireless communication cell can cover a geographic area extending from a base station. In various embodiments, the base stations can be any of a variety of cellular base stations dependent upon the cellular network standard(s) implemented in the wireless communication network 100. For example, a base station (e.g., a serving base station 104 or neighbor base station 108) in the wireless communication network 100 can be embodied as a base transceiver station (BTS) in a Global System for Communications (GSM) network or in a Code Division Multiple Access (CDMA) network, a Node B in a Universal Mobile Telecommunications System (UMTS) network, an evolved Node B (eNB) in a Long Term Evolution (LTE) network, or the like. The mobile wireless communication device 102 can receive communication signals from a number of different cells in the wireless communication network 100, and each cell (e.g., a base station transmitting a signal for the cell) can be located at a different distance from the mobile wireless communication device 102.

The mobile wireless communication device 102 can have a connection established with a serving base station 104 located within a serving cell 106. In this regard, communication between the mobile wireless communication device 102 and the wireless communication network 100 can be serviced by the serving base station 104 such that traffic between the mobile wireless communication device 102 and another entity via the wireless communication network 100 can be handled via a wireless connection between the mobile wireless communication device 102 and the serving base station 104.

The mobile wireless communication device 102 can monitor signals from nearby cells, referred to as neighbor cells 110, and can keep track of channel quality of a signal received at the mobile wireless communication device 102 from each of the cells. Channel quality measurements performed by the mobile wireless communication device 102 can include measurement of received signal strength or other parameter relating to a channel quality that can be used to assess the suitability of a cell for handling traffic between the mobile wireless communication device 102 and the wireless communication network 100. In this regard, a measured channel quality can include any measurement of a signal that can be used as a basis for a handover decision. For example, channel quality measurements can include measurement of received signal code power (RSCP), an energy per chip to total noise/interference ratio ($E_c/I_o$), an average bit energy on the spectral density of noise ($E_b/N_o$), and/or the like. In embodiments in which the wireless communication network 100 is a CDMA network, the channel quality measurement can include measurement of a pilot signal(s) that can be transmitted by the serving base station 104 and neighbor base stations 108 in accordance with some example embodiments.

Information about received channel quality can be communicated by the mobile wireless communication device 102 to the wireless communication network 100 using measurement messages. In embodiments in which the wireless communication network 100 is a CDMA network, a measurement messages can, for example, be a pilot strength measurement message (PSMM). The wireless communication network 100 can use the information provided in the measurement messages to determine if and when to change the cell to which the mobile wireless communication device 102 can be connected.

Figure 2:
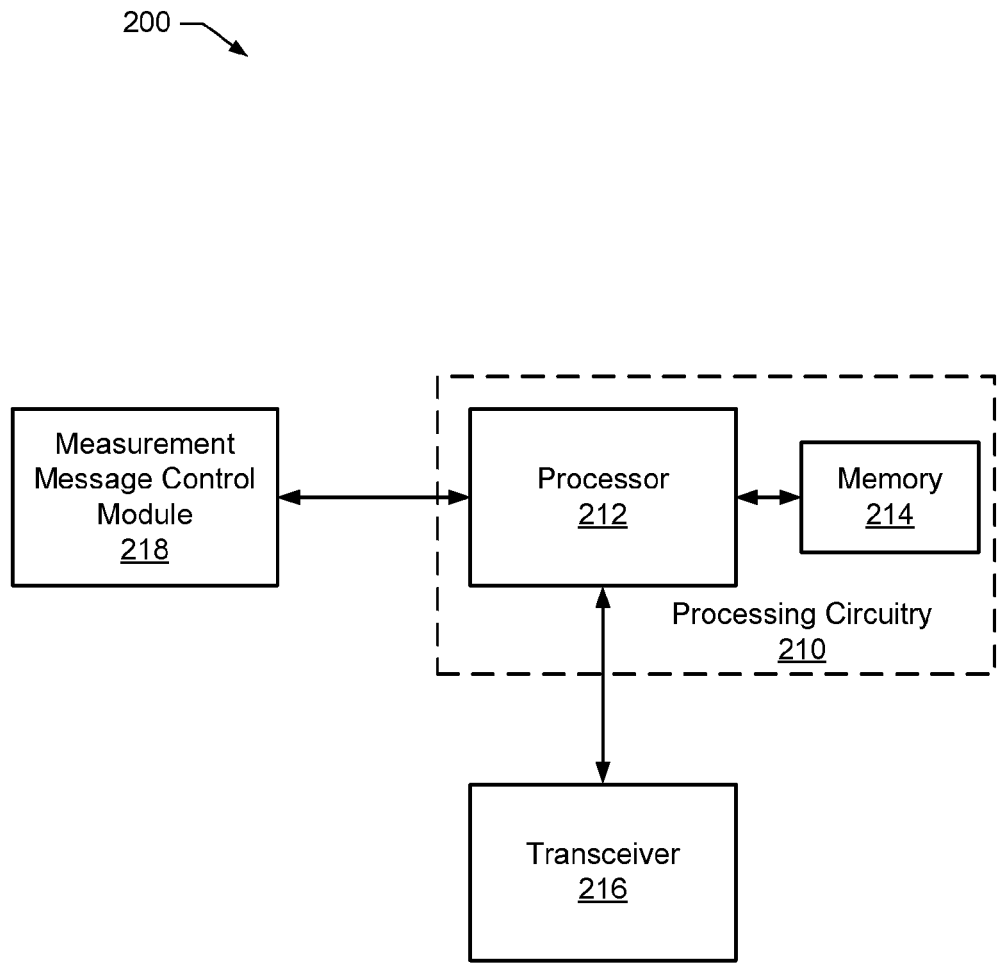
FIG. 2 illustrates a block diagram of an apparatus that can be implemented on a mobile wireless communication device in accordance with some example embodiments.

Channel quality information conveyed in a measurement message can, for example, be used to make handover decisions. In this regard, the mobile wireless communication device 102 can transition from the serving cell 106 to a neighbor cell 110 on the basis of a channel quality measured based on a signal transmitted by a neighbor base station 108. Attendant to transitioning to another cell, the connection between the mobile wireless communication device 102 and the serving base station 104 can be transferred to a neighbor base station 108 associated with a neighbor cell 110 to which the mobile wireless communication device 102 is transitioning. In this regard, as the mobile wireless communication device 102 moves within the wireless communication network 100, a radio frequency connection with the serving base station 104 can deteriorate in quality while a radio frequency connection with a neighbor base station 108 can improve. Accordingly, channel quality measurements, as indicated can be in measurement messages sent to the wireless communication network 100, can be used as a basis for handover decisions as the mobile wireless communication device 102 moves within the wireless communication network 100 FIG. 2 illustrates a block diagram of an apparatus 200 that can be implemented on a mobile wireless communication device 102 in accordance with some example embodiments. In this regard, when implemented on a computing device, such as mobile wireless communication device 102, apparatus 200 can enable the computing device to operate within the wireless communication network 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 may be configured to perform data processing, application execution and/or other processing and management services according to one or more example embodiments.

In some embodiments, the apparatus 200 or a portion(s) or component(s) thereof, such as the processing circuitry 210, can include one or more chips, or one or more chipsets. The processing circuitry 210 and/or one or more further components of the apparatus 200 can therefore, in some instances, be configured to implement an embodiment on a single chip or chipset. In some example embodiments in which one or more components of the apparatus 200 are embodied as a chip or chipset, the chip or chipset can be capable of enabling a computing device to operate in the wireless communication network 100 when implemented on or otherwise operably coupled to the computing device.

In some example embodiments, the processing circuitry 210 can include a processor 212 and, in some embodiments, such as that illustrated in FIG. 2, can further include memory 214. The processing circuitry 210 can be in communication with or otherwise control a transceiver 216 and/or measurement message control module 218.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, or measurement message control module 218 via a bus(es) for passing information among components of the apparatus 200.

The apparatus 200 can further include a transceiver 216. The transceiver 216 can enable the apparatus 200 to send wireless signals to and receive signals from a wireless network, such as the wireless communication network 100. As such, the transceiver 216 can be configured to support any type of cellular or other wireless communication technology that may be implemented by wireless communication network 100. Thus, by way of example, transceiver 216 can be configured to receive signals transmitted by serving base station 104 and one or more neighbor base stations 108 that may be within signaling range of the apparatus 200.

The apparatus 200 can further include measurement message control module 218. The measurement message control module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the measurement message control module 218.

The measurement message control module 218 can be configured in some example embodiments to determine a channel quality measurement for one or more cells (e.g., for serving cell 106 and/or one or more neighbor cells 110). For example, in some embodiments, the measurement message control module 218 can be configured to monitor a signal that can be received by the transceiver 216 and can measure a channel quality of the signal. As another example, in some embodiments, the transceiver 216 can measure a channel quality of a received signal and can pass an indication of the measured channel quality to the measurement message control module 218.

The measurement message control module 218 can be further configured to determine for a given channel quality measurement whether criteria for sending a measurement message generated on the basis of the channel quality measurement have been satisfied. The criteria for sending a measurement message can, for example, be a threshold channel quality value or threshold change in channel quality value from a previous measurement such that when a channel quality measurement has a value satisfying the threshold, the measurement message control module 218 can determine that a measurement message should be sent.

In some example embodiments, criteria for sending a measurement message can be whether a channel quality measurement indicates that a particular cell or signal related thereto should be added to or removed from a set of signals that may be used for selection of a handover candidate should the mobile wireless communication device 102 be handed over from the serving cell 106 to a neighbor cell 110. In this regard, signals received from base stations within range can be classified into sets based at least in part on a measured channel quality. Membership in these sets may be supervised by or communicated to the wireless communication network 100 to enable the wireless communication network 100 to make handover decisions based on signal quality experienced by the mobile wireless communication device 102 as the mobile wireless communication device 102 moves through the wireless communication network 100. Accordingly, should a channel quality measurement determined for a received signal have a value satisfying a threshold for adding or removing the signal or associated originating cell to or from a set, the measurement message control module 218 can be configured to determine that criteria for sending a measurement message for the channel quality measurement have been satisfied.

As an example, in CDMA networks, the channel quality measurement can include measurement of a pilot signal strength. Pilot signals received by the mobile wireless communication device 102 can be classified into sets on the basis of measured pilot signal strength. In embodiments in which the wireless communication network 100 implements a CDMA-based standard, measurement message control module 218 can be configured to send a PSMM to the wireless communication network 100 when a criteria for adding/removing a pilot to/from a set is met.

Figure 3:
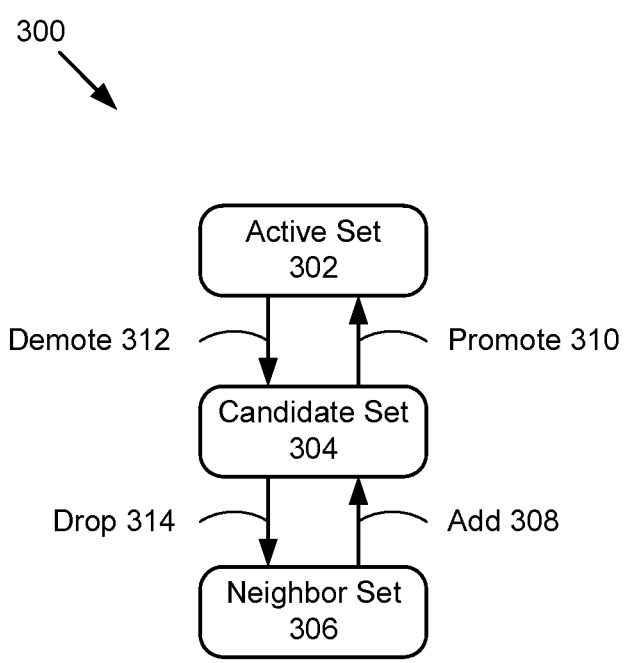
FIG. 3 illustrates pilot set maintenance in a mobile wireless communication device in accordance with some example embodiments.

FIG. 3 illustrates a state diagram 300 for classifications of pilots within a CDMA network that can be maintained by the measurement message control module 218 in accordance with some example embodiments. Pilots known by the mobile wireless communication device 102 can be classified into one of three different sets. A neighbor set 306 can include a set of neighbor base station pilots, such as may be transmitted by neighbor base stations 108, to which the mobile wireless communication device 102 can connect if there is sufficient signal strength. A candidate set 304 can include a set of candidate base station pilots that satisfy a minimum strength level with which the mobile wireless communication device 102 can connect. An active set 302 can include a set of active base station pilots to which the mobile wireless communication device 102 can be actively connected. The number of base station pilots included in the active set 302 can be limited by the wireless communication network 100, and in many networks is limited to six pilots or less.

A pilot in the neighbor set 306 can, for example, be added (state transition 308) to the candidate set 304 by the measurement message control module 218 when the measured pilot signal strength exceeds a pre-determined add threshold for a pre-determined add time period. A pilot in the candidate set 304 can, for example, be dropped (state transition 314) to the neighbor set 306 when measured pilot signal strength falls below a pre-determined drop threshold for a pre-determined drop period.

In some example embodiments, a PSMM can be sent to wireless communication network 100 in an instance in which a pilot is added to the candidate set 304 from the neighbor set 306 (state transition 308) and/or when a pilot is dropped from the candidate set 304 to the neighbor set 306 (state transition 314). However, in some example embodiments, sending a PSMM for moving pilots between the neighbor set and the candidate set (state transition 308 or state transition 314) can be optional, and the measurement control module 218 may be able to add a pilot to the candidate set 304 from the neighbor set 306 or drop a pilot from the candidate set 304 to the neighbor set 306 without receiving an explicit command to do so by the wireless communication network 100 and/or without sending a PSMM to the wireless communication network 100.

In some example embodiments, movement of pilots between the candidate set 304 and an active set 304 (state transitions 310 and 312) can require confirmation commands from the wireless communication network 100. As such, in some example embodiments, a PSMM can be sent to the wireless communication network 100 in an instance in which the measurement message control module 218 determines that a pilot in the candidate set 304 should be promoted (state transition 310) to the active set and/or that a pilot in the active set 302 should be demoted (state transition 312) to the candidate set. One or more further messages can be exchanged between the mobile wireless communication device 102 and wireless communication network 100 before a pilot is moved between the candidate set 304 and an active set 302.

The measurement message control module 218 can, for example, determine that a pilot in the candidate set 304 should be promoted (state transition 310) to the active set 302 based on a determination that the pilot has a signal strength that satisfies a set of performance criteria for a pre-determined period of time. The performance criteria can, for example, include signal strength level and/or changes to signal strength over time, such as a slope of a measured signal strength curve. The threshold for a pilot to be promoted from the candidate set 304 to the active set 302 can be higher than the threshold for a pilot to be added to the candidate set from the neighbor set 306. The mobile wireless communication device 102 can send a PSMM to the wireless communication network 100 requesting to promote (state transition 310) the pilot from the candidate set 304 to the active set 302. The pilot can be promoted to the active set 302 by the mobile wireless communication device 102 after receiving a handoff confirmation message from the wireless communication network 100. When no handoff confirmation message is received, the pilot can remain in the candidate set 304.

The measurement message control module 218 can, for example, determine a pilot should be demoted (state transition 312) from the active set 302 to the candidate set 304 based on a determination that a pilot in the active set 302 has a signal strength that falls below a pre-determined threshold level for a pre-determined period of time. The threshold for a pilot to be demoted (state transition 312) can be different from the threshold for a pilot to be promoted (state transition 310). The mobile wireless communication device 102 can send a PSMM to the wireless communication network 100 requesting to demote (state transition 312) the pilot from the active set 302 to the candidate set 304. A pilot in the active set 302 can, for example, be demoted to the candidate set 304 in response to receiving a handoff confirmation message from the wireless communication network 100.

Figure 4:
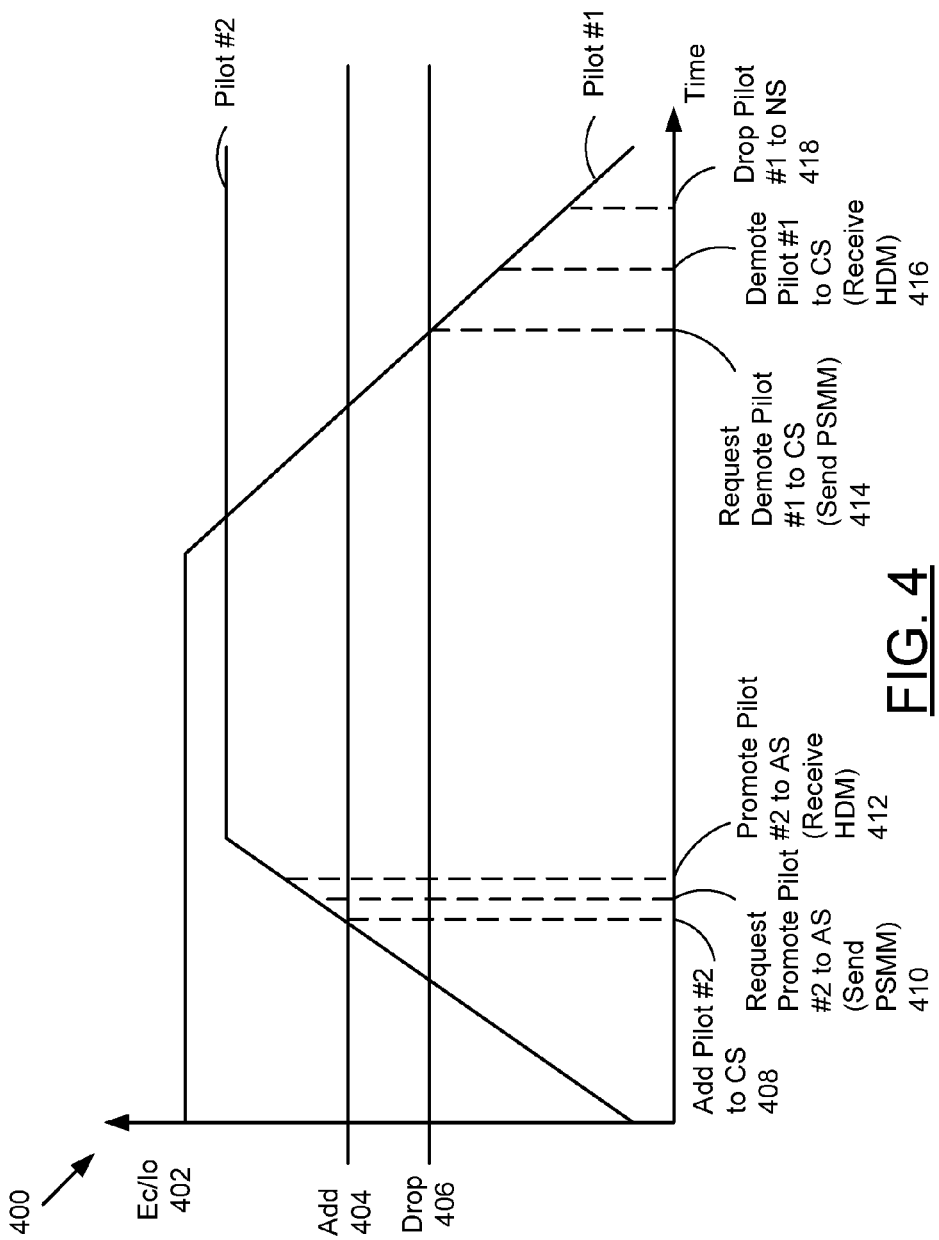
FIG. 4 illustrates pilot movement among pilot sets based on changing signal quality in accordance with some example embodiments.

FIG. 4 illustrates a graph 400 with movement of two example pilots between sets in the mobile wireless communication device 102 based on changing signal quality in accordance with some example embodiments. Pilot signal strength can, for example, be measured and reported in a PSMM as a signal to noise/interference ratio $E_c/I_o$ 402 as indicated. It will be appreciated, however, that alternative measures such as received signal strength or other signal quality metrics can also be used in place of the $E_c/I_o$ 402 shown herein for purposes of illustrative example. An add threshold 404 and a drop threshold 406 can be set for different levels of $E_c/I_o$ 402.

Initially a first pilot ("pilot #1") can have a high $E_c/I_o$ 402 while a second pilot ("pilot #2") can have a low $E_c/I_o$ 402. Pilot #1 can be in the active set, while pilot #2 can be in the neighbor set, as shown initially at the left side of the graph 400. The pilot #2 signal, as can be received and measured by the mobile wireless communication device 102, can then increase over time and surpass the add threshold 404. The measurement message control module 218 can determine that pilot #2 should be added to the candidate set (CS) from the neighbor set (NS) (e.g., state transition 308) at time 408 when pilot #2 measured $E_c/I_o$ can surpass the add threshold 404. After a pre-determined period of time, during which pilot #2 Ec/Io 1102 can be above the add threshold 404 continuously, the measurement message control module 218 can determine that a PSMM should be sent to request promotion of pilot #2 to the active set (e.g., state transition 310) by sending a PSMM to the wireless communication network 100 at time 410. In response to receiving a handoff direction message (HDM) from the wireless communication network 100, the mobile wireless communication device 102 can promote pilot #2 to the active set at time 412. Following the promotion of pilot #2, the first pilot #1 and the second pilot #2 can both be in the active set.

Signal conditions received at the mobile wireless communication device 102 can subsequently continue to change. With changing signal conditions, pilot #1 can degrade in signal quality while pilot #2 can maintain a relatively high signal quality. This can occur, for example, when the mobile wireless communication device 102 moves closer to base station from which pilot #2 emanates and further away from the base station from which pilot #1 is transmitted. The mobile wireless communication device 102 can continue to measure the $E_c/I_o$ for each pilot received to compare the quality of signals received from pilots in the active set. Relatively poorer performing pilots can be demoted when appropriately determined by the measurement message control module 218 and, in some instances, confirmed by the wireless communication network 100. As shown in FIG. 4, at time 414, the mobile wireless communication device 102 can request to demote (e.g., state transition 312) pilot #1 from the active set to the candidate set when pilot #1 falls below a drop threshold 406 by sending a second PSMM to the wireless communication network 100. In response to a handoff direction message confirmation from the wireless communication network 100, the mobile wireless communication device 102, at time 416, can demote pilot #1 from the active set to the candidate set. Subsequently the signal quality of pilot #1 can continue to decline. After measuring the signal quality of pilot #1 falling below a drop threshold 406 for a predetermined period of time, the mobile wireless communication device 102 can drop (e.g., state transition 314) pilot #1 from the candidate set to the neighbor set at time 418.

After determining that criteria for sending a measurement message is satisfied on the basis of a channel quality measurement, the measurement message control module 218 can generate a measurement message based at least in part on the channel quality measurement. The measurement message can be sent to the wireless communication network 100 in unassured mode. In this regard, unassured mode can be any mode in which a sender (e.g., the mobile wireless communication device 102) does not wait to receive an acknowledgement that a sent message has been received. After sending the measurement message, the measurement message control module 218 of some example embodiments can be configured to determine whether a handover message is received from the wireless communication network 100 within a timeout period following sending the first measurement message. The timeout period can be any period of time that may vary in duration in various embodiments. In some example embodiments, such as some embodiments in which the wireless communication network 100 is a CDMA network, the timeout period can be on the order of 400 milliseconds. The measurement message control module 218 can, for example, set a timer configured to run for up to a period coinciding with the timeout period in response to the measurement message being sent. If a handover message is not received prior to expiration of the timer, then the measurement message control module 218 can determine that a handover message is not received within the timeout period.

In an instance in which a handover message is not received within the timeout period following sending the measurement message, the measurement message control module 218 can be configured to determine an updated channel quality measurement representative of a channel quality measured more recently in time than the channel quality measurement based upon which the previous measurement message was sent. The measurement message control module 218 can generate a new measurement message based at least in part on the updated channel quality measurement. The new measurement message can, for example, have a different sequence number than the previous measurement message. The new measurement message can also be sent to the wireless communication network 100 in unassured mode. In some such embodiments, the measurement message control module 218 can determine whether criteria for sending a measurement message is still satisfied on the basis of the updated channel quality measurement prior to sending a new measurement message.

Figure 5:
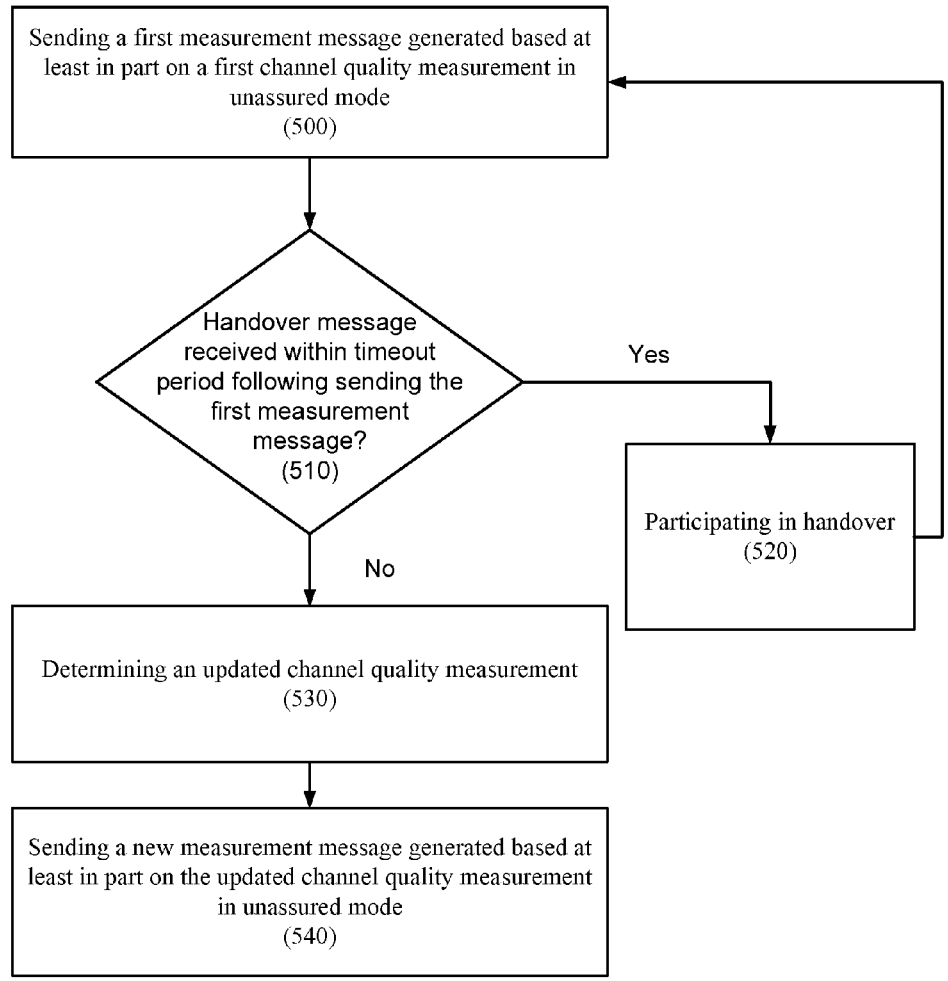
FIG. 5 illustrates a flowchart according to an example method for sending measurement messages with updated channel quality measurement information according to some example embodiments.

FIG. 5 illustrates a flowchart according to an example method for sending measurement messages with updated channel quality measurement information according to some example embodiments. Operation 500 can include sending a first measurement message generated based at least in part on a first channel quality measurement in unassured mode. One or more of processing circuitry 210, processor 212, memory 214, transceiver 216, or measurement message control module 218 can, for example, provide means for performing operation 500. Operation 510 can include determining whether a handover message was received within a timeout period following sending the first measurement message. One or more of processing circuitry 210, processor 212, memory 214, transceiver 216, or measurement message control module 218 can, for example, provide means for performing operation 510.

In an instance in which it is determined at operation 510 that a handover message was received within the timeout period, the method can proceed to operation 520, which can include participating in a handover in response to the handover message. Participating in the handover can, for example, include adding or removing a pilot from an active set in some example embodiments in which wireless communication network 100 is a CDMA network. Following handover, the method can return to operation 500.

If, however, it is determined at operation 510 that a handover message was not received within the timeout period, the method can proceed to operation 530, which can include determining an updated channel quality measurement. One or more of processing circuitry 210, processor 212, memory 214, transceiver 216, or measurement message control module 218 can, for example, provide means for performing operation 530. Operation 540 can include sending a new measurement message generated based at least in part on the updated channel quality measurement in unassured mode. One or more of processing circuitry 210, processor 212, memory 214, transceiver 216, or measurement message control module 218 can, for example, provide means for performing operation 540. In some example embodiments, it can be determined whether criteria for sending a measurement message remains satisfied on the basis of the updated channel quality measurement prior to performing operation 540. In this regard, in such embodiments, if criteria for sending a measurement message does is no longer satisfied, operation 540 can be omitted.

In some example embodiments, the measurement message control module 218 can continue to determine an updated channel quality and send a new measurement message generated based at least in part on a most recent updated channel quality measurement each time a handover message is not received within a timeout period following a most recent sent measurement message until either a handover message is received within a timeout period following a most recent measurement message having been sent or a threshold number of measurement messages has been sent. The threshold number can be any number, and can vary in various embodiments. The threshold number can, for example, be selected to avoid the mobile wireless communication device 102 staying connected to a serving cell too long in a situation in which a channel quality of the connection to the serving cell is degrading and the wireless communication network 100 continues to fail to receive measurement messages that can be sent by the mobile wireless communication device 102. In this regard, if the mobile wireless communication device 102 stays connected to a poor quality channel for too long, not only can it result in a bad user experience, but it can also burden network resources and cause interference to other devices operating within the serving cell. In some example embodiments, such as some embodiments in which the wireless communication network 100 is a CDMA network, the threshold number can be 13.

Figure 6:
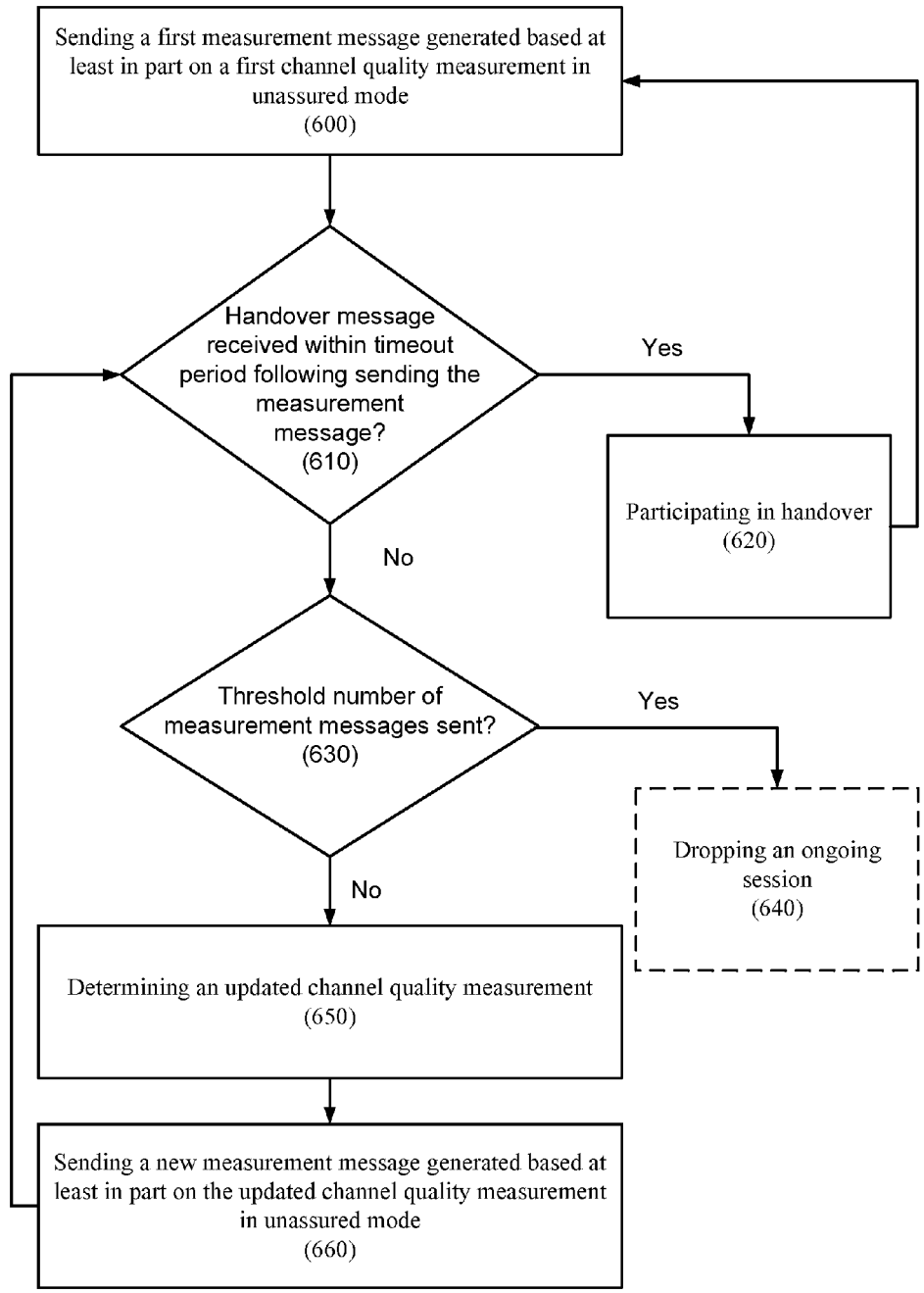
FIG. 6 illustrates a flowchart according to another example method for sending measurement messages with updated channel quality measurement information according to some example embodiments.

FIG. 6 illustrates a flowchart according to an example method for sending measurement messages with updated channel quality measurement information in which new measurement messages generated based at least in part on a most recent updated channel quality measurement can be repeated up to a threshold number of times in accordance with some example embodiments. Operation 600 can include sending a first measurement message generated based at least in part on a first channel quality measurement in unassured mode. One or more of processing circuitry 210, processor 212, memory 214, transceiver 216, or measurement message control module 218 can, for example, provide means for performing operation 600. Operation 610 can include determining whether a handover message was received within a timeout period following sending the first measurement message. One or more of processing circuitry 210, processor 212, memory 214, transceiver 216, or measurement message control module 218 can, for example, provide means for performing operation 610.

In an instance in which it is determined at operation 610 that a handover message was received within the timeout period, the method can proceed to operation 620, which can include participating in a handover in response to the handover message. Participating in the handover can, for example, include adding or removing a pilot from an active set in some example embodiments in which wireless communication network 100 is a CDMA network. Following handover, the method can return to operation 600.

If, however, it is determined at operation 610 that a handover message was not received within the timeout period, the method can proceed to operation 630, which can include determining whether a threshold number of measurement messages has been sent. One or more of processing circuitry 210, processor 212, memory 214, or measurement message control module 218 can, for example, provide means for performing operation 630.

In an instance in which it is determined at operation 630 that the threshold number of measurement messages has been sent, the method can proceed to operation 640, which can include dropping an ongoing session. The session can, for example, include a voice call, a data transfer, or any other session in which call traffic, data traffic, and/or other traffic can be exchanged over a connection between the mobile wireless communication device 102 and a serving base station 104. In CDMA networks, dropping an ongoing session can, for example, include exiting a traffic state. In some example embodiments, however, operation 640 can be omitted, or can be conditioned on further criteria beyond the threshold number of measurement messages having been sent. For example, in some embodiments, a minimum channel quality threshold can be sent. If the channel quality of a connection to a serving base station 104 exceeds the minimum channel quality threshold even after the threshold number of measurement messages have been sent, then operation 640 can be omitted, or can be delayed until the channel quality drops below the minimum channel quality threshold. One or more of processing circuitry 210, processor 212, memory 214, transceiver 216, or measurement message control module 218 can, for example, provide means for performing operation 640.

If, however, it is determined at operation 630 that the threshold number of measurement messages has not been sent, the method can proceed to operation 650, which can include determining an updated channel quality measurement. One or more of processing circuitry 210, processor 212, memory 214, transceiver 216, or measurement message control module 218 can, for example, provide means for performing operation 650. Operation 660 can include sending a new measurement message generated based at least in part on the updated channel quality measurement in unassured mode. One or more of processing circuitry 210, processor 212, memory 214, transceiver 216, or measurement message control module 218 can, for example, provide means for performing operation 660. In some example embodiments, it can be determined whether criteria for sending a measurement message remains satisfied on the basis of the updated channel quality measurement prior to performing operation 660. In this regard, in such embodiments, if criteria for sending a measurement message does is no longer satisfied, operation 660 can be omitted. After performing operation 660, the method can return to operation 610.

Figure 7:
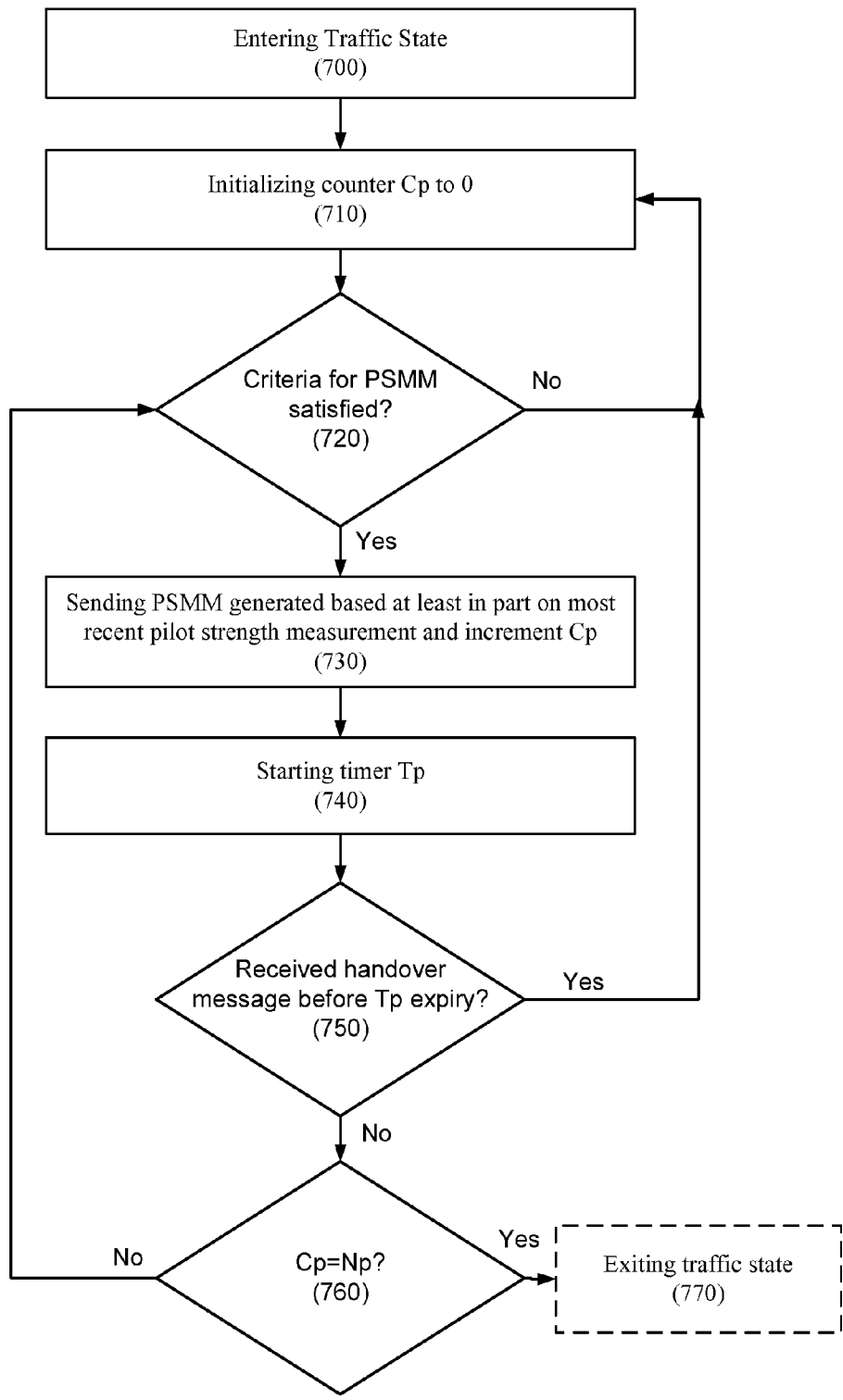
FIG. 7 illustrates a flowchart according to an example method for sending pilot strength measurement messages in a code division multiple access network according to some example embodiments.

FIG. 7 illustrates a flowchart according to an example method for sending pilot strength measurement messages in a code division multiple access network according to some example embodiments. Operation 700 can include entering a traffic state. Entering the traffic state can, for example, include participating in a voice call. One or more of processing circuitry 210, processor 212, memory 214, transceiver 216, or measurement message control module 218 can, for example, provide means for performing operation 700. Operation 710 can include initializing a counter "Cp" to 0. Cp can be used to track a number of PSMMs that have been sent. One or more of processing circuitry 210, processor 212, memory 214, or measurement message control module 218 can, for example, provide means for performing operation 710. Operation 720 can include determining whether criteria for sending a PSMM have been satisfied. One or more of processing circuitry 210, processor 212, memory 214, transceiver 216, or measurement message control module 218 can, for example, provide means for performing operation 720.

In an instance in which it is determined at operation 720 that criteria for sending a PSMM have not been satisfied, the method can return to operation 710. In this regard, Cp can be reset in some embodiments in an instance in which it is determined that criteria for sending a PSMM are not (or are no longer) satisfied.

If, however, it is determined at operation 720 that criteria for sending a PSMM has been satisfied, the method can proceed to operation 730, which can include sending a PSMM generated based at least in part on a most recent pilot strength measurement (e.g., a most recent measurement of a pilot for which it has been determined that criteria for sending a PSMM have been satisfied). Operation 730 can further include incrementing Cp to reflect that the PSMM was sent. One or more of processing circuitry 210, processor 212, memory 214, transceiver 216, or measurement message control module 218 can, for example, provide means for performing operation 730. Operation 740 can include starting a timer "Tp." Tp can have a period coinciding with a timeout period. In some example embodiments, Tp can, for example, have a period on the order of 400 milliseconds. One or more of processing circuitry 210, processor 212, memory 214, or measurement message control module 218 can, for example, provide means for performing operation 740.

Operation 750 can include determining whether a handover message was received before expiry of Tp. One or more of processing circuitry 210, processor 212, memory 214, transceiver 216, or measurement message control module 218 can, for example, provide means for performing operation 750.

In an instance in which it is determined at operation 750 that a handover message was received before expiry of Tp, the method can return to operation 710. In this regard, Cp can be reset in some embodiments in response to a handover message.

If, however, it is determined at operation 750 that a handover message was not received before expiry of Tp, the method can proceed to operation 760, which can include determining whether Cp equals Np. Np can be defined as a threshold number of PSMMs. The value of Np can vary by embodiment, but in some example embodiments can, for example, be 13. One or more of processing circuitry 210, processor 212, memory 214, or measurement message control module 218 can, for example, provide means for performing operation 750.

In an instance in which it is determined at operation 760 that Cp does not equal Np, the method can return to operation 720. If, however, it is determined at operation 760 that Cp does equal Np, the method can proceed to operation 770. Operation 770 can include exiting traffic state. Thus, for example, an ongoing voice call can be dropped. In some example embodiments, however, operation 770 can be omitted, or can be conditioned on further criteria beyond the threshold number of measurement messages having been sent (e.g., a determination that Cp equals Np). For example, in some embodiments, a minimum channel quality threshold can be sent. If the channel quality of a connection to a serving base station 104 exceeds the minimum channel quality threshold even after the threshold number of measurement messages have been sent, then operation 770 can be omitted, or can be delayed until the channel quality drops below the minimum channel quality threshold. One or more of processing circuitry 210, processor 212, memory 214, transceiver 216, or measurement message control module 218 can, for example, provide means for performing operation 770.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising a mobile wireless communication device:
   sending to a wireless network a first measurement message generated based at least in part on a first channel quality measurement in unassured mode;
   determining whether a handover message is received from the wireless network within a timeout period following sending the first measurement message;
   in an instance in which it is determined that the handover message is received from the wireless network within the timeout period, participating in a handover;
   in an instance in which it is determined that the handover message is not received from the wireless network within the timeout period:
      determining an updated channel quality measurement;
      sending to the wireless network a new measurement message generated based at least in part on the updated channel quality measurement in unassured mode;
      determining whether the handover message is received from the wireless network within a second timeout period following sending the new measurement message; and
      repeating determination of the updated channel quality measurement and sending to the wireless network an updated measurement message generated based at least in part on a most recently updated channel quality measurement until either the handover message is received from the wireless network within a subsequent timeout period following a most recently sent measurement message or a threshold number of measurement messages are sent to the wireless network; and
   in an instance in which the threshold number of measurement messages are sent to the wireless network without receiving from the wireless network the handover message within the subsequent timeout period following a last sent measurement message, dropping an ongoing session between the mobile wireless communication device and the wireless network.

2. The method of claim 1, wherein the threshold number is 13.

3. The method of claim 1, wherein each timeout period is 400 milliseconds.

4. The method of claim 1, wherein dropping the ongoing session comprises dropping a voice call.

5. The method of claim 1, wherein dropping the ongoing session comprises exiting a traffic state of the wireless network, wherein the wireless network implements a Code Division Multiple Access (CDMA) based standard.

6. The method of claim 1, wherein dropping the ongoing session comprises dropping the ongoing session only in an instance in which a channel quality drops below a threshold quality after the threshold number of measurement messages are sent to the wireless network without receiving from the wireless network the handover message within the subsequent timeout period following the last sent measurement message.

7. A mobile wireless communication device comprising:
   a transceiver configured to transmit data to and receive data from a wireless network; and
   processing circuitry configured to control the mobile wireless communication device to at least:
      send to the wireless network a first measurement message generated based at least in part on a first channel quality measurement in unassured mode;
      determine whether a handover message is received from the wireless network within a timeout period following the first measurement message having been sent;
      in an instance in which it is determined that the handover message is received from the wireless network within the timeout period, participate in a handover; and
      in an instance in which it is determined that the handover message is not received from the wireless network within the timeout period:
         determine an updated channel quality measurement;
         send to the wireless network a new measurement message generated based at least in part on the updated channel quality measurement in unassured mode;
         determine whether the handover message is received from the wireless network within a second timeout period following the new measurement message having been sent; and
         repeatedly determine the updated channel quality measurement and send to the wireless network an updated measurement message generated based at least in part on a most recently updated channel quality measurement until either the handover message is received from the wireless network within a subsequent timeout period following a most recently sent measurement message or a threshold number of measurement messages are sent to the wireless network; and
      in an instance in which the threshold number of measurement messages are sent to the wireless network without receiving from the wireless network the handover message within the subsequent timeout period following a last sent measurement message, drop an ongoing session between the mobile wireless communication device and the wireless network.

8. The mobile wireless communication device of claim 7, wherein:
   the wireless network comprises a Code Division Multiple Access (CDMA) wireless network; and
   the processing circuitry is configured to control the mobile wireless communication device to drop the ongoing session at least in part by exiting a traffic state.

9. The mobile wireless communication device of claim 7, wherein the processing circuitry is further configured to control the mobile wireless communication device to determine the updated channel quality measurement based at least in part on whether a criteria for sending a measurement message to the wireless network remains satisfied prior to sending the new measurement message to the wireless network, and wherein the new measurement message is not sent to the wireless network in an instance in which it is determined that the criteria does not remain satisfied.

10. A non-transitory computer readable storage medium having computer program code stored thereon, the computer program code comprising:
program code for sending to a wireless network a first measurement message generated based at least in part on a first channel quality measurement in unassured mode;
program code for determining whether a handover message is received from the wireless network within a timeout period following sending the first measurement message;
program code for, in an instance in which it is determined that the handover message is received from the wireless network within the timeout period, participating in a handover;
program code for, in an instance in which it is determined that the handover message is not received from the wireless network within the timeout period:
determining an updated channel quality measurement;
sending to the wireless network a new measurement message generated based at least in part on the updated channel quality measurement in unassured mode;
determining whether the handover message is received from the wireless network within a second timeout period following sending the new measurement message; and
repeating determination of the updated channel quality measurement and sending to the wireless network an updated measurement message generated based at least in part on a most recently updated channel quality measurement until either the handover message is received from the wireless network within a subsequent timeout period following a most recently sent measurement message or a threshold number of measurement messages are sent to the wireless network; and
program code for, in an instance in which the threshold number of measurement messages are sent to the wireless network without receiving from the wireless network the handover message within the subsequent timeout period following a last sent measurement message, dropping an ongoing session with the wireless network.

11. A method comprising a mobile wireless communication device:
sending, to a wireless network in unassured mode, a first pilot strength measurement message (PSMM) generated based at least in part on a first pilot strength measurement;
determining whether a handover message is received from the wireless network within a timeout period following sending the first PSMM;
in an instance in which it is determined that a handover message is received from the wireless network within the timeout period, participating in a handover; and
in an instance in which it is determined that a handover message is not received from the wireless network within the timeout period:
determining an updated pilot strength measurement; and
sending, to the wireless network in unassured mode, a new PSMM generated based at least in part on the updated pilot strength measurement.

12. A mobile wireless communication device comprising:
a transceiver configured to transmit data to and receive data from a Code Division Multiple Access (CDMA) wireless network; and
processing circuitry configured to control the mobile wireless communication device to at least:
send to the CDMA wireless network in unassured mode a first pilot strength measurement message (PSMM) generated based at least in part on a first pilot strength measurement;
determine whether a handover message is received from the CDMA wireless network within a timeout period following the first PSMM having been sent;
in an instance in which it is determined that the handover message is received from the CDMA wireless network within the timeout period, participate in a handover; and
in an instance in which it is determined that the handover message is not received from the CDMA wireless network within the timeout period:
determine an updated pilot strength measurement; and
send to the CDMA wireless network in unassured mode a new PSMM generated based at least in part on the updated pilot strength measurement.

* * * * *